United States Patent

Nilsson

[11] 3,912,177
[45] Oct. 14, 1975

[54] LOCKING DEVICE FOR VEHICLE SAFETY HARNESSESS

[75] Inventor: Karl-Ivar Nilsson, Upplands Vasby, Sweden

[73] Assignee: AB Instrument-Verken, Sweden

[22] Filed: Feb. 11, 1974

[21] Appl. No.: 441,117

[52] U.S. Cl. .............................................. 242/107.4
[51] Int. Cl. ............................................. A62b 35/00
[58] Field of Search ................. 242/107.4; 297/388; 280/150 SB

[56] References Cited
UNITED STATES PATENTS

| | | |
|---|---|---|
| 2,708,555 | 5/1955 | Heinemann .................... 242/107.4 |
| 2,845,233 | 7/1958 | Pfankuch ....................... 242/107.4 |
| 3,722,824 | 3/1973 | Hayoshi ......................... 242/107.4 |
| 3,758,044 | 9/1973 | Nilsson .......................... 242/107.4 |

Primary Examiner—Edward J. McCarthy
Attorney, Agent, or Firm—Klarquist, Sparkman, Campbell, Leigh, Hall & Whinston

[57] ABSTRACT

The present invention relates to a locking device for a vehicle safety harness provided with a take-up reel on which the belt of the harness is automatically wound when not in use and from which it can be withdrawn when in use, said locking device being intended to become operative to lock the reel against rotation upon rapid changes in the speed and/or the direction of movement of the vehicle.

5 Claims, 3 Drawing Figures

U.S. Patent  Oct. 14, 1975  3,912,177
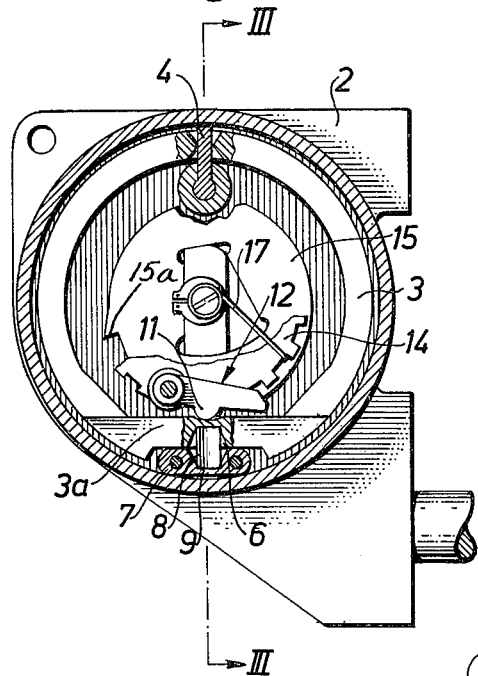
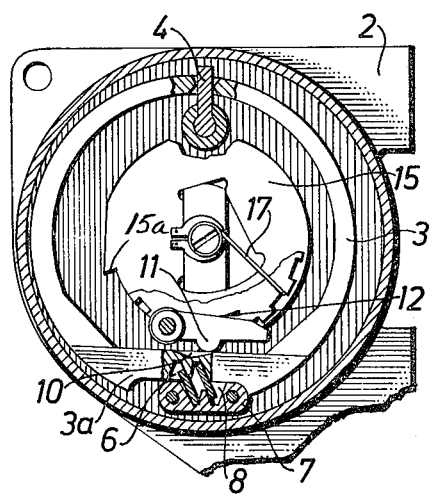
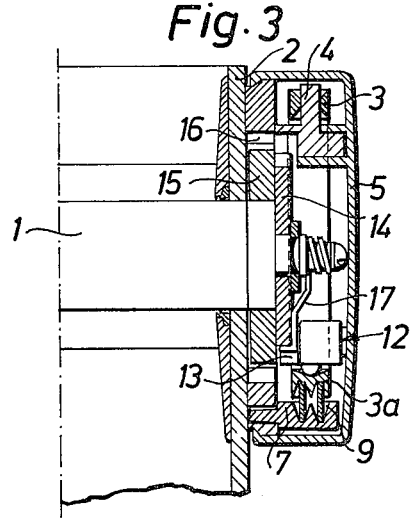

LOCKING DEVICE FOR VEHICLE SAFETY HARNESSESS

Modern vehicle safety harnesses and especially car safety harnesses are normally of the aforementioned design, i.e. are provided with a belt take-up reel, on which the safety belt is at least partially wound when not in use. With this design of vehicle safety harness, the belt, when in use, is held removed from the vicinity of the vehicle occupants, so as not to lie on the vehicle floor and create an obstacle to those entering and leaving the vehicle, and so as not to become soiled. When the belt is to be used, the belt is withdrawn from the reel and its free end engaged in a suitably located fitting. With the belt in its operative position, the wearer is permitted certain freedom of movement, since the belt can be unwound from the reel a certain distance further. This freedom of movement must be eliminated, however, in the event of a collision or in the event of the vehicle being sharply and heavily braked, and consequently means must be provided to lock the belt in a manner to enable it to hold the wearer against the large forces occurring during the vehicle braking or collision moment.

With conventional safety harnesses of the type envisaged, locking of the belt in the aforementioned situations is effected by locking the reel on which the belt is wound. The locking devices normally used generally comprise a moveable member which causes the reel to be locked when said member is subjected to the high inertia forces occurring during the said situations. Difficulty has been found, however, in providing a locking device which will constantly permit freedom of movement of the safety harness belt, when worn, with normal vehicle movement but which will positively stop and reliably lock the reel against rotation when vehicle acceleration in any direction exceeds a predetermined value, said value being only slightly greater than the highest acceleration occurring with normal vehicle movement. Practical tests have shown that no known vehicle safety harness construction operates satisfactorily in this respect.

The object of the present invention is to provide a locking device of the aforementioned type which is not influenced by normal movements of the vehicle but which positively locks the take-up reel when vehicle acceleration in any direction exceeds a determined value lying but slightly above the highest acceleration value occurring during normal vehicle movement. This object is achieved by means of the belt locking device according to the invention, which is mainly characterized by a pendulum-like member which is so mounted at a first end thereof that said member is freely pivotable in all directions, a second end of the pendulum-like member being arranged to rest against a first end of a support member whose other end is arranged to rest against a support surface in a housing in which the locking device and reel are arranged, wherein the pendulum-like member is provided with a planar surface having a recess or a raised portion arranged to co-act with a corresponding recess or raised portion on a pawl member mounted in the housing, said pawl member being arranged for movement into engagement with a tooth on a toothed ring upon swinging movement of the pendulum-like member, to lock the reel.

The invention will now be described in more detail with reference to an embodiment thereof illustrated in the accompanying drawing, on which FIG. 1 is a partially cut-away side view of a locking device according to the invention, showing the members of said device in their rest position, FIG. 2 is a side view corresponding to the view of FIG. 1 but showing the locking device members in their locking position, and FIG. 3 is a sectional view taken through the line III—III in FIG. 1.

The drawing shows an embodiment of a locking device constructed in accordance with the invention. Only that portion of the reel mechanism necessary for illustrating the invention is shown, however, the actual safety belt (not shown) of the safety harness is arranged to be wound onto a reel 1 mounted for rotation in a housing 2, of which only a portion is shown on the drawing.

The locking device of the present invention includes a pendulum-like member 3, which in the illustrated embodiment has the form of a ring. The ring 3 is suitably made of a relatively light material and has a portion 3a of heavier material arranged at its lower portion. The centre of gravity of the ring 3 is therefore located very low down on the ring. At its upper portion, the ring 3 has a vertical bore which is conically shaped at either end thereof so as to leave a ring-shaped edge approximately at the centre of the bore. Extending through the bore is a vertically extending peg 4 to which is attached a cap 5 and on which the ring 3 is pivoted. The cap 5 is arranged to cover the whole of the locking device and is held securely in a determined position relative to the housing 2. The ring 3 is able to pivot freely to a limited extent in all directions around its journalling point on the peg 4. The ring 3 is also arranged for free axial movement on the peg 4.

The under surface of the lower portion 3a of the ring 3 is generally planar and extends horizontally when the ring occupies its rest position. Arranged in said under surface is a conical recess 6, the diameter of which decreases upwardly. Located immediately beneath the under surface of the ring 3 and attached to the housing 2 is a support plate 7 having disposed therein a conical recess 8 whose diameter decreases downwardly. The recess 8 is situated opposite the recess 6. Arranged in the recesses 6 and 8 is a support member in the form of a tubular member 9, the diameter of which is substantially equal to the diameter of the bottom portions of the recesses 6 and 8. The tube 9 is arranged to bear against said bottom portions of said recesses and the length of the tube is such that the under surface of the ring 3 is located immediately above the upper surface of the support plate 7. Thus, the ring 3 rests against the tube 9 which in turn rests against the support plate 7. The ring 3 thereby obtains a stable rest position.

The upper surface of the lower portion 3a of the ring 3 is planar and extends horizontally and is provided with a shallow recess 10 of conical configuration and having a very large apex angle. When the ring 3 occupies its rest position, the shallow recess 10 is located opposite a shoulder 11 on a pawl 12 which is mounted on a peg in the housing 2. The shoulder 11 lies in the recess 10 when the locking device is inoperative, as shown in FIG. 1.

When the housing 2 is subjected to acceleration forces in any direction, the ring 3 is subjected to an inertia force which attempts to swing the ring 3 around its bearing point on the peg 4. With vehicle accelerations up to a certain limit, i.e. with inertia forces on the ring 3 below a certain value, rotation of the ring 3 is prevented by the tube 9. When the inertia forces exceed a certain value, however, the tube 9 is actuated by a resulting force which causes the tube to tilt to the position shown in FIG. 2, wherewith the ring 3 also is moved to said position in FIG. 2. This outward movement of ring 3 causes the shoulder 11 of pawl 12 to be moved up out of the recess 10 whereupon the pawl 12 is rotated anti-clockwise to the position in FIG. 2. As the pawl 12 is moved counter-clockwise, a latching tooth 13 (FIG. 3) on the pawl 12 is moved into engagement with a notch on a toothed wheel 14 mounted on the shaft or reel 1. Rotation of the reel 1 to withdraw the belt therefrom will cause the toothed wheel to remain stationary. A plate 15 connected to the toothed wheel 14 will also remain stationary in relation to the reel 1. The plate 15, however, is so mounted on the shaft or reel 1 that mutual movement of the shaft moves the tooth on plate 15 into engagement with a tooth of a sprocket wheel 16 secured to the housing 2. In this way the reel 1 is locked against further rotation, thereby preventing withdrawal of the belt from the reel. When the inertia forces acting on the ring 3 fall to a level below the aforementioned excessive value, the ring 3 will return to its rest position, whereupon the pawl 12 moves out of engagement with the toothed wheel 14. The plate 15 is returned to its rest position by a spring 17 immediately after tension forces cease to act on the belt.

It is evident from the aforegoing that there is provided with the locking device according to the invention a clearly defined limit under which no locking of the reel takes place and above which the reel is positively locked to prevent withdrawal of the belt thereon. This limit can be readily changed by changing the mass of the ring 3 or the diameter of the tube 9 or its length. It should be noted, that the described and illustrated direction of movement of the ring 3 as it swings outwardly merely constitutes an example of ring movement to effect locking of the reel. In practice, outward swinging of the ring 3 may take place in any direction whatsoever, to provide the same result.

The invention is not restricted to the described and illustrated embodiment but can be modified within the scope of the following claims.

I claim:

1. In a vehicle safety belt locking device for safety harnesses of the type having reel means mounted for rotation in a housing, toothed means connected to said reel means, and pawl means mounted for movement in said housing, a belt being automatically wound on said reel means when not in use, said belt being withdrawn from said reel means when in use, said pawl means being operative to engage said toothed means and lock said reel means against rotation upon rapid changes in vehicle speed or vehicle direction of movement, the improvement comprising:
   a supporting surface in said housing;
   a pendulum-like member mounted at a first end thereof for freely pivotable motion in all directions above said supporting surface, said pendulum-like member having a planar surface thereon;
   a support member disposed between said pendulum-like member and said supporting surface,
      said pendulum-like member being supported at a second end thereof by a first end of said support member,
      said support member being supported in turn at a second end thereof by said supporting surface; and
   cooperating means comprising
      recess means disposed in one of said planar surface of said pendulum-like member and said pawl means, and
      raised means disposed on the other of said planar surface of said pendulum-like member and said pawl means,
      said recess means and said raised means being adapted to co-act to move said pawl means into engagement with said toothed means upon swinging movement of said pendulum-like member, thereby to lock said reel.

2. The locking device of claim 1, in which said pendulum-like member comprises a ring-shaped member, said ring-shaped member encircling one end of said reel means, and in which said planar surface on said pendulum-like member is formed on the inside of said ring-shaped member.

3. The locking device of claim 1, in which said support member comprises a cylindrical tube.

4. The locking device of claim 1 further comprising stop means in said housing to limit the movement of said pendulum-like member and said support member.

5. The locking device of claim 4, in which said stop means comprises a first conical recess disposed in said supporting surface to receive said second end of said support member, said first conical recess having a bottom for supporting said support member, and a second conical recess disposed in said second end of said pendulum-like member to receive said first end of said support member.

* * * * *

UNITED STATES PATENT OFFICE
CERTIFICATE OF CORRECTION

PATENT NO. : 3,912,177
DATED : October 14, 1975
INVENTOR(S) : KARL-IVAR NILSSON

It is certified that error appears in the above-identified patent and that said Letters Patent are hereby corrected as shown below:

Column 3, line 19, "the tooth" should be --a tooth 15a--.

Signed and Sealed this tenth Day of February 1976

[SEAL]

Attest:

RUTH C. MASON
Attesting Officer

C. MARSHALL DANN
Commissioner of Patents and Trademarks